United States Patent
Savry et al.

(10) Patent No.: US 12,174,939 B2
(45) Date of Patent: Dec. 24, 2024

(54) METHOD FOR THE EXECUTION OF A BINARY CODE OF A COMPUTER PROGRAM BY A MICROPROCESSOR

(71) Applicant: Commissariat à l'Energie Atomique et aux Energies Alternatives, Paris (FR)

(72) Inventors: Olivier Savry, Grenoble (FR); Thomas Hiscock, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 308 days.

(21) Appl. No.: 17/650,885

(22) Filed: Feb. 14, 2022

(65) Prior Publication Data

US 2022/0292182 A1 Sep. 15, 2022

(30) Foreign Application Priority Data

Mar. 9, 2021 (FR) ..................................... 21 02265

(51) Int. Cl.
*G06F 21/52* (2013.01)
*G06F 8/41* (2018.01)
*G06F 8/53* (2018.01)

(52) U.S. Cl.
CPC .............. *G06F 21/52* (2013.01); *G06F 8/434* (2013.01); *G06F 8/53* (2013.01); *G06F 2221/033* (2013.01)

(58) Field of Classification Search
CPC . G06F 21/52; G06F 8/434; G06F 8/53; G06F 2221/033; G06F 21/54
See application file for complete search history.

(56) References Cited

U.S. PATENT DOCUMENTS

| | | | |
|---|---|---|---|
| 2003/0105938 A1* | 6/2003 | Cooksey ............. | G06F 12/0897 711/E12.004 |
| 2013/0205285 A1* | 8/2013 | Pizlo ................... | G06F 9/45516 717/151 |

(Continued)

FOREIGN PATENT DOCUMENTS

| | | | | |
|---|---|---|---|---|
| EP | 3 761 199 A1 | 1/2021 | | |
| JP | 2007282020 A | * 10/2007 | ......... | H04N 13/0454 |
| WO | WO-2006133407 A2 | * 12/2006 | .............. | H03M 7/30 |

OTHER PUBLICATIONS

French Preliminary Search Report issued Nov. 25, 2021 in French Application 21 02265 filed on Mar. 9, 2021, 10 pages (with English Translation of Categories of Cited Documents & Written Opinion).

(Continued)

*Primary Examiner* — Bassam A Noaman
(74) *Attorney, Agent, or Firm* — Oblon, McClelland, Maier & Neustadt, L.L.P.

(57) ABSTRACT

A method for the execution of a binary code defining a data structure including a particular field to be read using a pointer, this method including writing, to the main memory, the value of the particular field associated with a first identifier of a pointer that points directly to this particular field, this identifier being determined from an identifier of the particular field that differs for all of the fields of the data structure that are adjacent to the particular field, and then constructing a pointer that points directly to this particular field, this construction including determining an identifier of this constructed pointer, and then checking that the identifier constructed in step b) corresponds to the identifier associated with this particular field in step a), and when these pointer identifiers do not match, triggering the signaling of an execution fault.

13 Claims, 4 Drawing Sheets

(56) References Cited

U.S. PATENT DOCUMENTS

Figure 1:
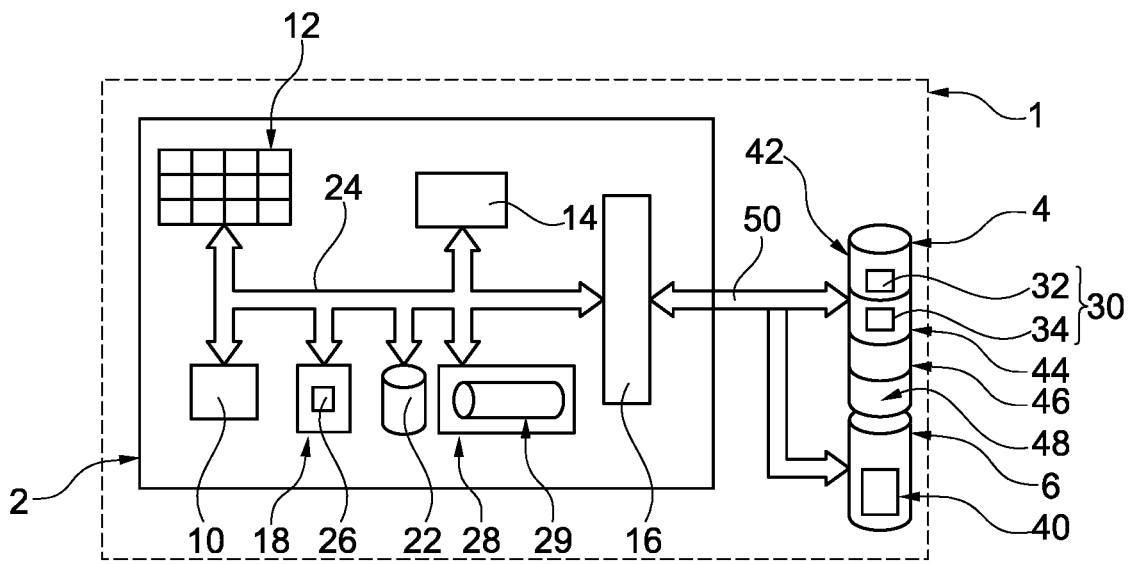

| | | | |
|---|---|---|---|
| 2014/0130027 A1* | 5/2014 | Chen | G06F 8/41 |
| | | | 717/151 |
| 2019/0095354 A1* | 3/2019 | Savry | G06F 21/54 |
| 2020/0218662 A1* | 7/2020 | Ren | G06F 9/30065 |
| 2021/0004456 A1 | 1/2021 | Savry | |

OTHER PUBLICATIONS

Das et al., "SHAKTI-MS: a RISC-V processor for memory safety in C", Languages, Compilers, and Tools for Embedded Systems, 2019, pp. 19-32.

* cited by examiner

METHOD FOR THE EXECUTION OF A BINARY CODE OF A COMPUTER PROGRAM BY A MICROPROCESSOR

The invention relates to a method for the execution of a binary code of a computer program by a microprocessor. The invention also relates to:
- a binary code of a computer program, an information recording medium and a microprocessor for implementing this execution method, and
- a compiler for generating the binary code.

Numerous attacks are possible in order to obtain information about a binary code or to cause unexpected operation of the binary code.

Some of these attacks are based on erroneous use of a datum pointer. It will be recalled here that a datum pointer is a datum that contains the address of the datum to be processed and not directly the value of the processed datum.

The use of such data pointers is common in an executable code. For example, such a pointer is used to point to the first cell of a table of multiple cells. Subsequently, to process the following cell in this table, it is enough to simply increment the address contained in the pointer by a predetermined increment.

During design of the source code, provision is made for the pointer to manipulate and process a group of data of a predetermined size. However, during execution of the corresponding binary code, it is sometimes possible to arrange for this pointer to point to a datum located outside of this group of data. For example, such erroneous use of this pointer is caused by inputting, into an input field, a datum the size of which is much larger than that initially provided for by the developers of the program. By virtue thereof, it is possible to write data to ranges of addresses where they should not be written. In other words, the pointer is used to point to invalid addresses. An example of this first type of attack is known by the term stack overflow attack, when this attack targets the stack used by the computer program. When the pointer is used to write data before the address range provided to this end in the stack, the attack is likewise known as a stack underflow attack.

This first type of attack may be carried out in a fairly similar way to write data to invalid addresses in portions of the memory other than the stack, such as for example in a portion known as the heap.

These first types of attacks have in common that they use a valid pointer to point to invalid addresses. They are thus said to affect the field of spatial safety.

Erroneous uses of pointers that affect the field of temporal safety also exist. In this case, an invalid pointer is used to point to a valid address. An invalid pointer is a pointer that has been used in a valid way to process data in a limited context, and that is then reused outside of this limited context. This may occur if, for example, this pointer has not been correctly reinitialized or initialized. This type of invalid pointer is known as a dangling pointer.

Certain attacks therefore locate these invalid pointers, then use them to read or write data at times at which they should not be used for this purpose. By way of illustration of this second type of attack, mention may be made of use-after-free attacks.

A number of solutions have already been proposed to make erroneous use of a pointer more difficult.

In particular, one solution of interest is disclosed in application EP3761199A1. This solution consists in using enriched pointers. In this case, each pointer $P_j$ comprises, in addition to the address $@_j$ of the datum $D_j$ to which it points, a range of bits containing an identifier $IP_j$ that distinguishes this pointer $P_j$ from other pointers used in the same execution of the binary code. In addition, the datum $D_j$ intended to be read using this enriched pointer $P_j$ is associated with the identifier $IP_j$ of this pointer. Next, each time a pointer $P_x$ is used to read the datum $D_j$, a detection mechanism is implemented in order to detect whether this is actually the pointer $P_j$. To this end, this mechanism checks that the identifier $IP_x$ contained in the pointer $P_x$ actually corresponds to the identifier $IP_j$ associated with the datum $D_j$. Typically, there is not a match between the identifiers $IP_x$ and $IP_j$ unless the identifier $IP_x$ is the same as the identifier $IP_j$. In the opposite case, there is no match and an error is signalled. This method makes it possible to detect virtually any erroneous uses of a pointer, and in particular both attacks that affect the spatial field and those that affect the temporal field.

However, the inventors have discovered an erroneous use of pointers that cannot be detected using the method from application EP3761199A1. This erroneous use exploits the fact that, in order to manipulate a data structure $S_j$ comprising multiple fields, a single pointer $PS_j$ pointing directly to the starting address $@S_j$ of this structure $S_j$ is used. Next, the address of a field $C_{j,k}$ to be read from the structure $S_j$ is deduced from the address $@S_j$ contained in this pointer $PS_j$ and from the position of the field $C_{j,k}$ with respect to the address $@S_j$. Normally, only the pointer $PS_j$ is defined in the binary code, as it would be highly laborious to define, in the binary code, for each field of the structure $S_j$, a pointer that points directly to the start of this field. Specifically, for example, it is far easier to pass, as argument of a function that processes one or more fields of the structure $S_j$, just the pointer $PS_j$ rather than passing as argument a pointer for each field of the structure $S_j$ to be processed.

In this context, the inventors observed that, by entering a value far greater than that initially intended by the developers of the program for a field of the structure $S_j$, then it was possible to carry the value of this field over onto the adjacent fields of the structure $S_j$ without this being able to be detected by the method from application EP3761199A1. This stems from the fact that the same pointer $P_1$ is used to read and write each field of the structure $S_j$.

The invention aims to improve the method from application EP3761199A1 and, in particular, to be able to detect the carrying over of the value from a field of a data structure onto an adjacent field of this data structure.

The following article is also known from the prior art: SOURAV DAS et AL: "SHAKTI-MS: a RISC-V processor for memory safety in C", Languages, Compilers, and Tools for Embedded Systems, ACM, 23 Jun. 2019, pages 19-32.

One subject of the invention is therefore such a method for the execution of a binary code of a computer program by a microprocessor.

Another subject of the invention is a binary code comprising instructions for executing the steps of the above execution method when these instructions are executed by a microprocessor.

Another subject of the invention is an information recording medium containing the above binary code.

Another subject of the invention is a microprocessor for implementing the above method.

A final subject of the invention is also a compiler able to automatically transform a source code of a computer program into a binary code of this computer program, this source code defining a data structure comprising multiple fields able to be accessed independently of one another including at least one particular field to be read using a pointer, and the binary code is the above binary code containing instructions for executing the steps of the above execution method.

Figure 2:
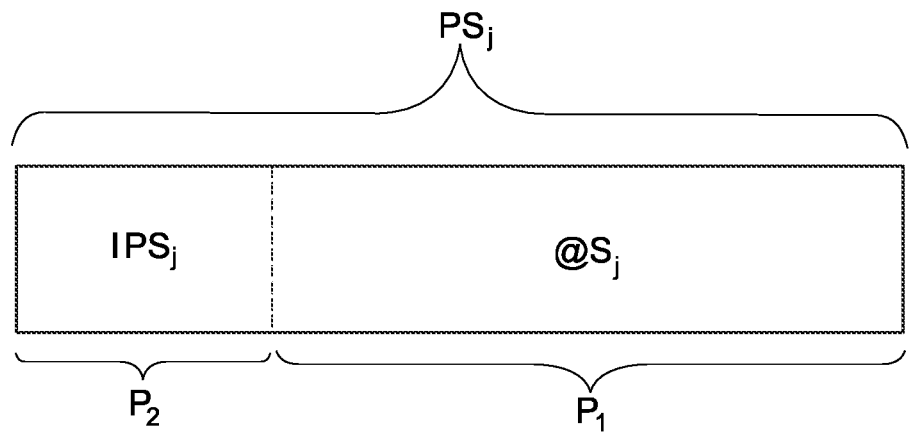
Figure 3:
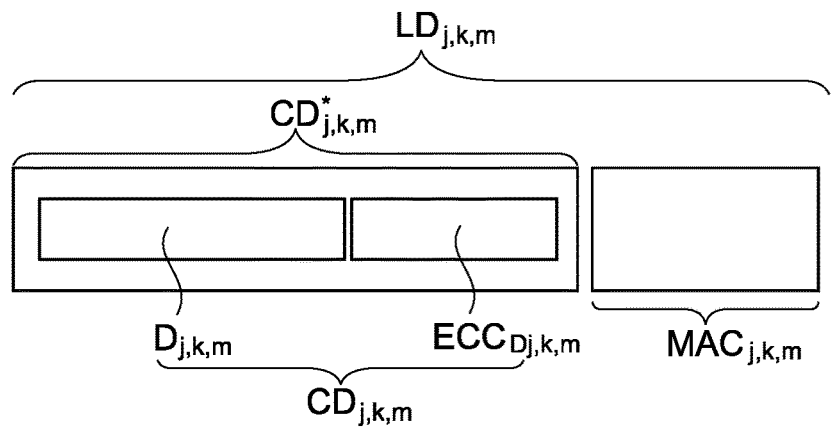
Figure 4:
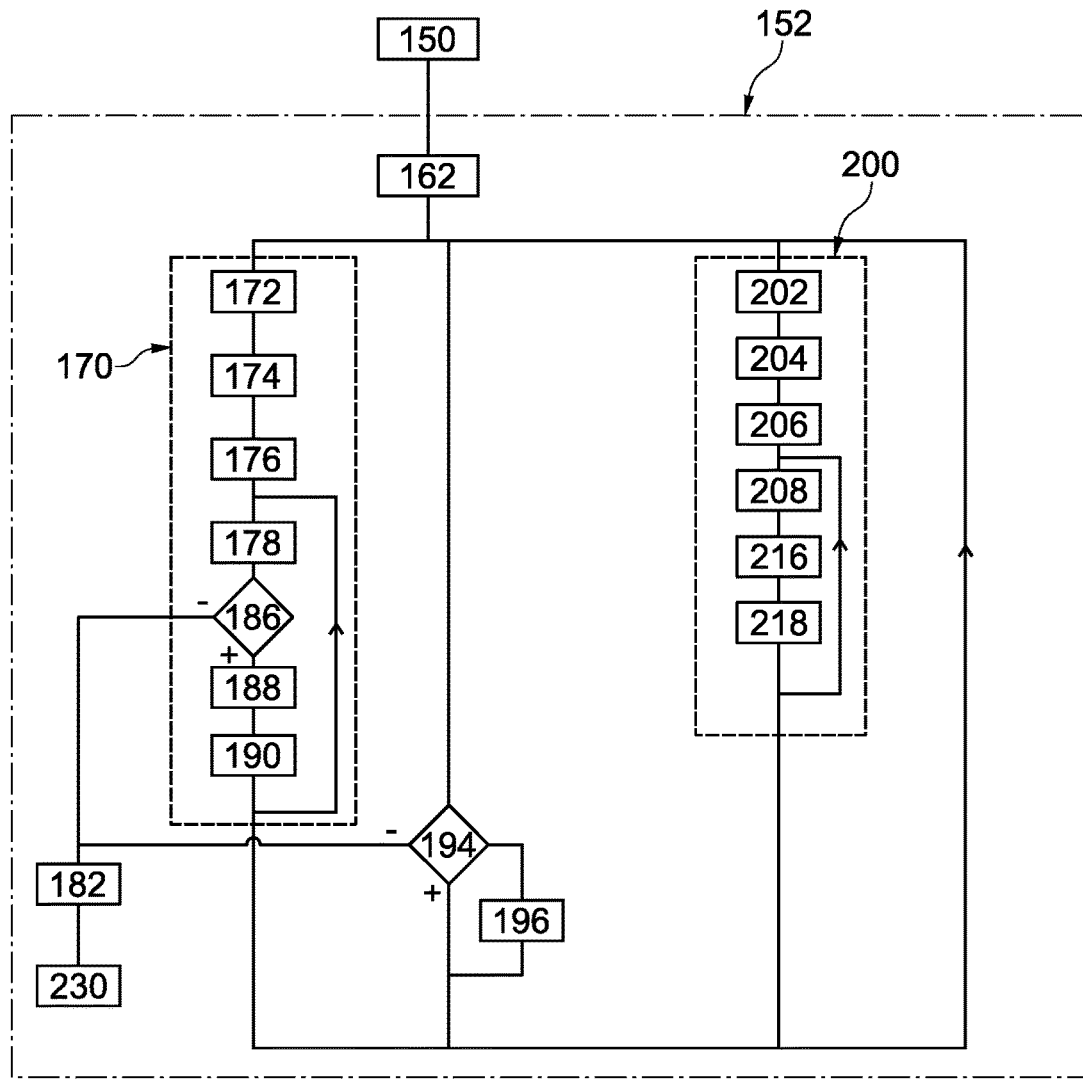
Figure 5:
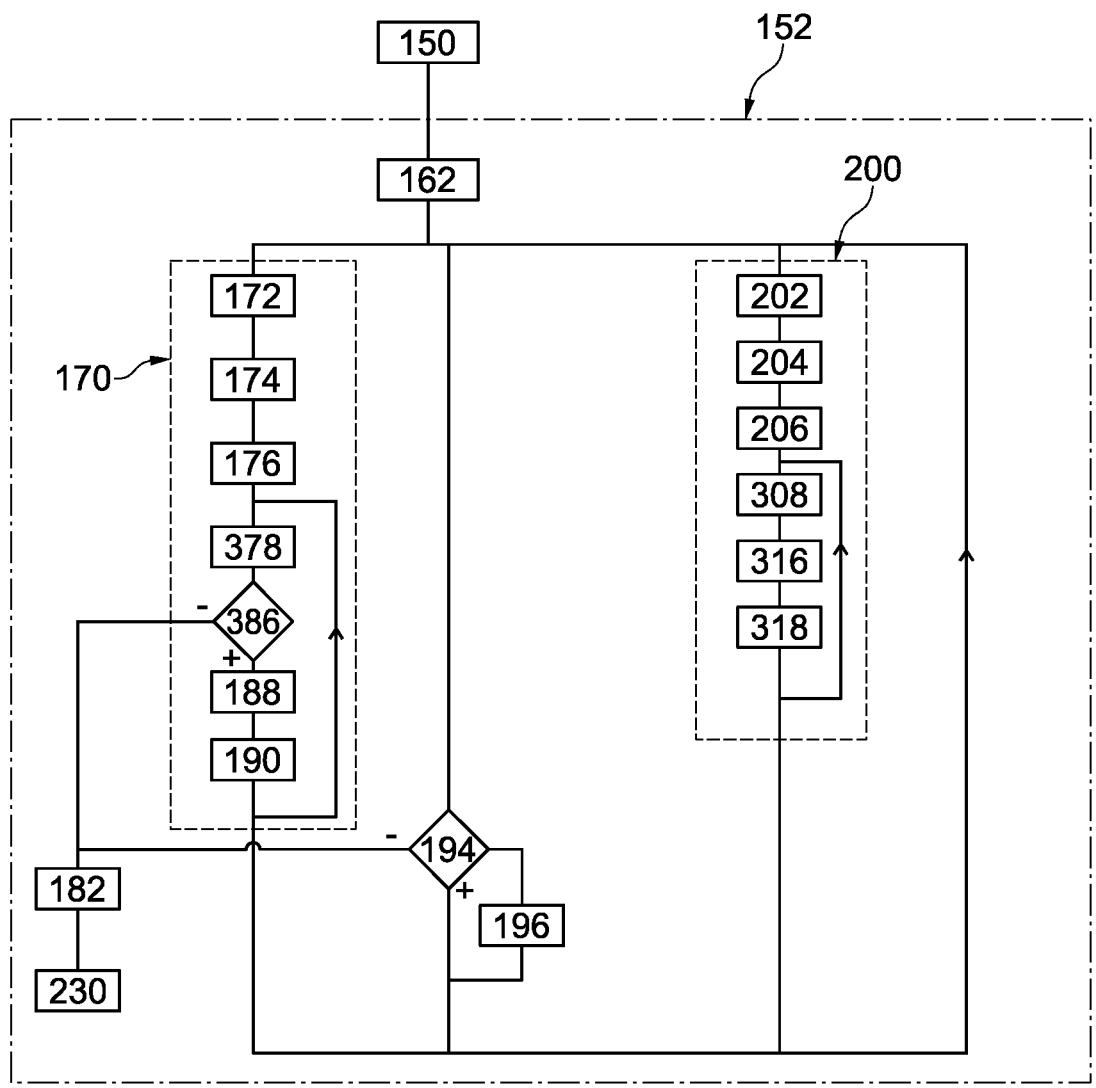
Figure 6:
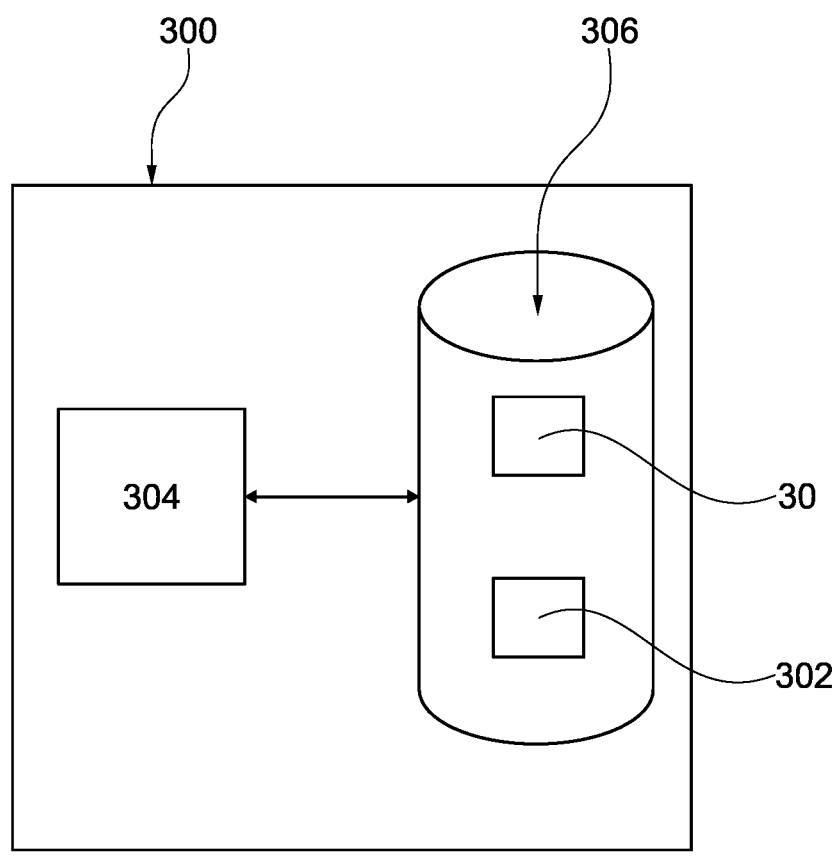

The invention will be better understood on reading the description that follows, which is given solely by way of non-limiting example, with reference to the drawings, in which:

FIG. 1 is a schematic illustration of the architecture of an electronic apparatus able to execute a binary code of a computer program, FIG. 2 is a schematic illustration of the structure of an enriched pointer used in the execution of the binary code by the apparatus of FIG. 1, FIG. 3 is a schematic illustration of the structure of a data line used in the execution of the binary code by the apparatus of FIG. 1, FIGS. 4 and 5 are flowcharts, respectively, of a first and a second embodiment of a method for the execution of the binary code by the apparatus of FIG. 1, FIG. 6 is a schematic illustration of a compiler able to generate the binary code executed by the apparatus of FIG. 1.

Section I: Conventions, Notations and Definitions

In the figures, the same references have been used to designate elements that are the same. In the rest of this description, features and functions that are well known to a person skilled in the art will not be described in detail.

In this description, the following definitions have been adopted.

A "program" designates a set of one or more predetermined functions that it is desired to have executed by a microprocessor.

A "source code" is a representation of the program in a computer language, not being able to be executed directly by a microprocessor and being intended to be transformed, by a compiler, into a machine code able to be executed directly by the microprocessor.

A program or a code is said to be "able to be executed directly" or "directly executable" when it is able to be executed by a microprocessor without this microprocessor needing to compile it beforehand by way of a compiler or to interpret it by way of an interpreter.

An "instruction" designates a machine instruction able to be executed by a microprocessor. Such an instruction consists:
of an opcode, or operation code, that codes the nature of the operation to be executed, and
of one or more operands defining the one or more values of the parameters of this operation.

A "machine code" is a set of machine instructions. It typically is a file containing a sequence of bits with the value "0" or "1", these bits coding the instructions to be executed by the microprocessor. The machine code is able to be executed directly by the microprocessor, that is to say without the need for a preliminary compilation or interpretation.

A "binary code" is a file containing a sequence of bits with the value "0" or "1". These bits code data and instructions to be executed by the microprocessor. The binary code thus comprises at least one machine code and also, in general, digital data processed by this machine code.

To be executed by a microprocessor, the binary code is stored in lines in a main memory. Typically, the binary code comprises several hundred or thousand lines. Each of these lines is called a "line of code". Each line of code is stored at an address that is specific thereto in the main memory. Each line of code contains a single instruction or a single datum. Hereinafter, when the code contained in the line of code corresponds to an instruction, this line of code is called an "instruction line". When the code contained in the line of code corresponds to a datum, the line of code is called a "data line". The term "code" is for its part used to designate both an instruction and a datum, and the term "line of code" is used to denote both a data line and an instruction line.

The address space of the program is the set of addresses of the lines of code that the program is able to read or write when it is executed. When a virtual memory mechanism exists, the address space of the program is generally a wide continuous range of addresses, called "virtual" addresses, which are possible for lines of code to be read or to be written.

A "data structure" is a set of multiple fields grouped together within a continuous address range in the address space of the program. This range contains only fields that belong to this data structure. Within the data structure, the various fields are classified in a predetermined order with respect to one another. Within a data structure, the various fields of this data structure are stored one after another in a predetermined order when the data structure is defined. The various fields of a data structure are accessed using, for this purpose, a pointer that points to the starting address of this data structure and the position of the field to be accessed with respect to the start of this data structure. One conventional example of a data structure is a table comprising multiple cells. In this example, each cell corresponds to a field of the data structure.

A "field" of a data structure is either a datum or a data structure. When the field itself is a data structure, then this daughter data structure is embedded within a parent data structure. Hereinafter, to distinguish between the various levels of data structures embedded within one another, the root data structure, that is to say the one that does not have a parent data structure, is said to be of rank 0. The daughter data structure embedded within the parent data structure is said to be of rank 1. If the data structure of rank 1 itself also comprises a daughter data structure, then this daughter data structure is said to be of rank 2, and so on.

In this text, a pointer that points directly to the start of a data structure is called "data structure pointer". Such a data structure pointer contains in particular the starting address of the data structure pointed to in the address space of the program.

A "field pointer" is a pointer that points directly to the start of a field of a data structure.

Unless indicated otherwise, the term "pointer" on its own denotes any type of pointer, and therefore both a structure pointer and a field pointer.

A field "adjacent" to a particular field of a data structure designates the field of this same data structure that immediately precedes or follows this particular field.

The expression "execution of a function" is understood to designate execution of the instructions implementing this function.

For the sake of simplicity, in this description and in the figures, the instructions are not shown in binary form, but rather in a symbolic form expressed in a sophisticated higher-level language.

Section II: Architecture of the Apparatus

FIG. 1 shows an electronic apparatus 1 comprising a microprocessor 2, a main memory 4 and a mass storage medium 6. For example, the apparatus 1 is a computer, a smartphone, an electronic tablet or the like.

The microprocessor 2 here comprises:
an arithmetic logic unit 10;
a set 12 of registers;
a control module 14;
a data input/output interface 16,
an instruction loader 18 having a program counter 26,
a queue 22 of instructions to be executed, and
a hardware security module 28.

The memory 4 is configured so as to store instructions and data of a binary code 30 of a program to be executed by the microprocessor 2. The memory 4 is a random access memory. The memory 4 is typically a volatile memory. The memory 4 may be a memory external to the microprocessor 2, as shown in FIG. 1. In this case, the memory 4 is formed on a substrate that is mechanically separate from the substrate on which the various elements of the microprocessor 2, such as the unit 10, are formed.

The memory 4 is divided here into successive data words of fixed length. Each data word is individually addressable and may be transferred in a single clock cycle from the memory 4 to a register of the microprocessor by way of a data bus. To this end, the size $N_{MM}$ of a data word is equal to the maximum number of bits able to be transferred simultaneously on this data bus. The size $N_{MM}$ is strictly greater here than $N_{inst}$ bits, where $N_{inst}$ bits is the number of bits of the instructions of the set of instructions of the microprocessor 2. $N_{inst}$ is typically an integer greater than or equal to 8, 16, 32 or 64. In this example, $N_{inst}$ is equal to 32 and the size $N_{MM}$ is equal to 128 bits.

The position of each data word in the memory 4 is identified by an address. To receive this address, the memory 4 is connected to the microprocessor 2 by an address bus. The size $N_{@}$ of the address, in number of bits, defines the maximum number of data words that are able to be addressed individually in the memory 4. Typically, the size $N_{@}$ is larger than or equal to 8, 16, 32 or 64 bits. For example, in this embodiment, the size $N_{@}$ is equal to 64 bits.

The memory 4 is conventionally divided into multiple portions. For example, here, the memory 4 comprises in particular the following portions:
a first portion 42 containing the instructions to be executed,
a second portion 44 containing data to be processed,
a third portion 46 used to save the execution context of a routine when it calls another routine, and
a fourth portion 48 used to dynamically allocate memory to the program during execution with a view to storing data therein.

The portion 42 is known by the term "code segment". The portion 44 typically contains the static and global variables of the executed program. The portion 46 is known by the term "call stack". Therefore, below, the portion 46 is also called the "stack 46". Lastly, the portion 48 is known by the term "heap". Therefore, below, the portion 48 is also called the "heap 48".

The binary code 30 in particular comprises the machine code 32 of the program and a block 34 of data necessary for the execution of the binary code 30. The machine code 32 and the block 34 are stored in portions 42 and 44, respectively.

Each line of code of the binary code corresponds here to a machine word. A line of code is thus loaded into a register of the microprocessor 2 in a single read operation. Likewise, a line of code is written to the memory 4 by the microprocessor 2 in a single write operation. The structure of a data line is described in detail with reference to FIG. 3.

The execution of the binary code 30 thus starts with loading and processing of the data of the block 34. Here, in particular, the block 34 comprises in particular a cryptogram ka* obtained by encrypting a secret key ka using a public key $pk_{CPU}$ of the microprocessor 2.

By way of illustration, the microprocessor 2 is a reduced-instruction-set computer (RISC) and implements the "RISC-V" instruction set.

The unit 10 here is an $N_{inst}$-bit arithmetic logic unit.

The loader 18 loads the next instruction to be executed by the unit 10 to the queue 22 from the portion 42 of the memory 4. More precisely, the loader 18 loads the instruction to which the program counter 26 points.

The unit 10 is in particular configured so as to execute the instructions loaded into the queue 22 one after another. The instructions loaded into the queue 22 are generally systematically executed in the order in which these instructions were stored in this queue 22. The unit 10 is also capable of storing the result of these executed instructions in one or more of the registers of the set 12.

In this description, "execution by the microprocessor 2" and "execution by the unit 10" will be used synonymously.

The module 14 is configured so as to move data between the set 12 of registers and the interface 16. The interface 16 is in particular able to acquire data and instructions, for example from the memory 4 and/or the medium 6 that are external to the microprocessor 2.

The module 28 is capable of automatically executing the various operations described in detail in the following sections in order to secure the execution of the binary code 30. The module 28 operates independently and without using the unit 10. It is thus capable of processing the lines of code before and/or after they are processed by the unit 10. To this end, it comprises in particular a secure non-volatile memory 29. There is no provision to access this memory 29 without going via the module 28. In this embodiment, the module 28 is preprogrammed, for example during its manufacture, to execute operations such as the following operations:
check the integrity and the authenticity of a line of code based on a message authentication code (better known by the acronym MAC),
construct a message authentication code,
encrypt a code in order to obtain a cryptogram of this code,
decrypt a cryptogram of a code in order to obtain the code in cleartext form, and
execute a preprogrammed function $F_{iv}$.

The memory 29 is used to store the secret information required to implement the method of FIGS. 4 and 5. Here, it therefore in particular comprises secret information that was stored before the start of the execution of the binary code 30. In particular, it comprises the following information stored beforehand:
a secret key k used to check the message authentication codes, and
a secret private key $sk_{CPU}$ that allows the data encrypted using the public key $pk_{CPU}$ to be decrypted.

In this exemplary embodiment, the set 12 comprises general registers able to be used to store any type of data. The size of each of these registers is for example equal to $N_{MM}$.

A data interchange bus 24 that connects the various components of the microprocessor 2 to one another is shown in FIG. 1 in order to indicate that the various components of the microprocessor are able to interchange data with one another. The data bus and the address bus that connect the microprocessor 2 to the memory 4 have been shown by a double-headed arrow 50 in order to simplify FIG. 1.

The medium 6 is typically a non-volatile memory. It is for example an EEPROM or flash memory. Here, it contains a backup copy 40 of the binary code 30. It is typically this copy 40 that is automatically copied to the memory 4 to restore the code 30, for example after a power failure or the like or just before the execution of the code 30 starts.

Section III: Securing of the Data Structures

First Embodiment

In this embodiment, the pointers that point to data located outside a data structure are for example secured as described in application EP3761199A1. Thus, hereinafter, only the case of data structure pointers is described in detail.

The binary code 30, in addition to the machine code 32, may contain data structures to be processed when the machine code 32 is executed. In addition, when the machine code 32 is executed, this may also dynamically generate data structures. These data structures are typically contained in the portion 44 of the memory 4 and/or the heap 48.

Likewise, each time a calling function triggers the execution of a called function, the execution context of the calling function is saved to the stack 46. The called function also saves data such as local variables to the stack 46. Some of these local variables stored in the stack 46 may be data structures.

To process and manipulate these data structures, the machine code 32 uses data structure pointers. Such a pointer contains the starting address, in the address space of the program, of the data structure to be processed. As described in the introduction of this application, erroneous use of a data structure pointer may be exploited in order to successfully conduct an attack against the program. To detect and shut down such attacks, here, each field $C_{j,k}$ of a structure $S_j$ that is processed using a data structure pointer $PS_j$ is stored in one or more consecutive data lines $LD_{j,k,m}$. Hereinafter, the index "j" is an identifier of the structure $S_j$. The index "k" is the order number of the field $C_{j,k}$ within the structure $S_j$. By convention, here, the index k of the first field of a data structure is equal to zero. Then, the index k of the second field of this data structure is equal to one, and so on. The index "m" is an order number that makes it possible to distinguish the lines $LD_{j,k,m}$ in which the value of the field $C_{j,k}$ is stored. The lines $LD_{j,k,m}$ are used only to store the value of the field $C_{j,k}$ therein, and no value of another field of the structure $S_j$. If the value of the field $C_{j,k}$ is able to be stored in a single line, then only one line $LD_{j,k,0}$ exists. By contrast, if the value of the field $C_{j,k}$ is not able to be stored in a single line, then multiple lines $LD_{j,k,m}$ are used to store its value. By convention, the index m of the first of the lines $LD_{j,k,m}$ is equal to zero. Next, the index m is incremented by one for each of the following lines $LD_{j,k,m}$.

Here, the size of the line $LD_{j,k,m}$ is equal to the size of a data word, and therefore equal to the size $N_{MM}$.

The pointer $PS_j$ contains the address $@S_j$ of the structure $S_j$ and makes it possible to process and manipulate the various fields of this structure. This pointer $PS_j$ may typically be passed as argument of a function that processes and manipulates the fields of the structure $S_j$.

The structure of the pointer $PS_j$ is shown in FIG. 2. Here, the size of the pointer $PS_j$ is equal to the size $N_@$ of the memory addresses. The pointer $PS_j$ comprises:

a first range $P_1$ of bits containing the starting address $@S_j$ of the structure $S_j$, and a second separate range $P_2$ of bits containing an identifier $IPS_j$ of the pointer $PS_j$.

The structure $S_j$ is stored in a virtual address range the size of which is strictly smaller than $2^{N_@}$ in order to leave enough space to code the identifier $IPS_j$ within the pointer $PS_j$. To this end, the size of the range $P_1$ is smaller than $N_@-N_P$ bits, where $N_P$ is the size, in number of bits, of the range $P_2$. Preferably, the size $N_P$ is greater than or equal to 4 bits or 8 bits or 16 bits and, generally, smaller than 32 bits or 54 bits. Here, the size $N_P$ is equal to 8 bits and the addresses $@S_j$ are therefore coded on 56 bits. In this embodiment, the range $P_1$ corresponds to the $N_@-N_P$ least significant bits of the pointer $PS_j$ and the range $P_2$ corresponds to the $N_P$ most significant bits of the pointer $PS_j$. To obtain the address $@S_j$ of the structure $S_j$ from the pointer $PS_j$, it is therefore enough to mask the most significant bits of the pointer $PS_j$ that are used to store the identifier $IPS_j$.

The address $@S_j$ is a virtual address in the address space of the program. Such a virtual address is then converted automatically into a physical address by a memory management unit (better known by the acronym MMU).

The identifier $IPS_j$ is an identifier that makes it possible to uniquely identify the pointer $PS_j$ among a set of other pointers used in the same execution of the binary code 30. It is constructed so as to limit the probability of two different pointers having the same pointer identifier. Thus, in this text, "uniquely identify a pointer among a set of other pointers" denotes the fact that the probability of two pointers used in the same execution of the binary code having the same pointer identifiers is lower than a one in ten chance and, preferably, a one in fifty chance or a one in one hundred chance or a one in one thousand chance.

The identifier $IPS_j$ may be generated when the source code is compiled in order to obtain the binary code 30. This is for example the case when the pointer $PS_j$ is declared in the source code. When the source code is compiled, to minimize the probability of two different pointers having the same pointer identifier, for example, the compiler generates the identifier $IPS_j$ of the pointer by randomly or pseudo-randomly drawing this identifier from a set EIP. The set EIP contains all the possible pointer-identifier values with the exception of values already assigned to a pointer identifier. In another embodiment, the identifier $IPS_j$ is randomly or pseudo-randomly drawn each time from the set EIP. By way of illustration, to do this, in the case of a compiler using LLVM (low-level virtual machine), the instruction "Alloca" is modified so that the pointer generated at the time when the source code is compiled comprises an identifier $IPS_j$ and an address $@S_j$. The instruction "Alloca" generates a pointer that points to the starting address $@S_j$ of the memory area in which the structure $S_j$ is stored.

A pointer may also be generated when executing the binary code 30. This is in particular the case when the binary code contains an instruction that, when it is executed by the microprocessor 2, dynamically allocates a free memory area for the storage of a data structure therein. When this instruction is executed, it generates a data structure pointer $PS_j$ that points to the start of the allocated memory area. Such instructions are commonly used to dynamically allocate a memory area in the heap 48. Next, an instruction that defines the data structure is executed. This instruction makes it possible to establish a correspondence between a field of the data structure and data lines located within the allocated memory area. For example, in a source code using the standard libraries of the C language, the memory area allocation instructions correspond to the functions "malloc( )", "calloc( )", "realloc( )", etc. In this case, these functions "malloc( )", "calloc( )", "realloc( )", etc. are modified so that the pointer $PS_j$ that they generate comprises the identifier $IPS_j$ in addition to the address $@S_j$. Preferably, each execution of such a function must generate an identifier $IPS_j$ that is as different as possible from the identifier $IPS_j$ generated in the previous execution of this same function. To do this, for example, on each execution of such a function:

the identifier $IPS_j$ is drawn, randomly or pseudo-randomly, from the set EIP, or the identifier $IPS_j$ is taken to be equal to the digital fingerprint obtained by applying a hash function to the address $@S_j$.

Such a pointer $PS_j$ that contains other information, that is to say here the identifier $IPS_j$, in addition to the address $@S_j$, is called "enriched pointer".

In a source code using the standard libraries of the C language, a function that makes it possible to define the various fields of a data structure when it is executed is for example the "CAST" function.

The structures of the data lines are identical. This structure is shown in FIG. 3 in the particular case of the line $LD_{j,k,m}$.

The line $LD_{j,k,m}$ contains a cryptogram $CD_{j,k,m}^*$ and a code $MAC_{j,k,m}$.

The cryptogram $CD_{j,k,m}^*$ is obtained by encrypting a concatenation $CD_{j,k,m}$ using the secret key ka and an initialization vector $iv_{j,k,m}$. More precisely, the cryptogram $CD_{j,k,m}^*$ is obtained using the following relationship: $CD_{j,k,m}^* = f_{ka}(CD_{j,k,m}; iv_{j,k,m})$, where $f_{ka}$ is an encryption function, corresponding to a decryption function $f_{ka}^{-1}$, preprogrammed in the module 28. The function $f_ka$ is typically a symmetric encryption function. Therefore, the key ka for decrypting the cryptogram $CD_{j,k,m}^*$ is pre-recorded in the memory 29 in order to allow the module 28 to decrypt this cryptogram $CD_{j,k,m}^*$.

Here, the vector $iv_{j,k,m}$ is a vector whose value depends on an address $@LD_{j,k,m}$ and on a field identifier $IPC_{j,k}$. The address $@LD_{j,k,m}$ is the address of the line $LD_{j,k,m}$ in the address space of the program. The identifier $IPC_{j,k}$ is an identifier that makes it possible to uniquely identify a pointer $PC_{j,k}$ among a set of other pointers and, in particular, among other pointers that point directly to other fields of the structure $S_j$. The identifier $IPC_{j,k}$ makes it possible in particular to unambiguously distinguish between a pointer that points directly to the field $C_{j,k}$ and pointers that point directly to the adjacent fields $C_{j,k-1}$ and $C_{j,k+1}$. Preferably, the identifier $IPC_{j,k}$ makes it possible to distinguish between the pointer $PC_{j,k}$ and any pointer that points directly to another field of the structure $S_j$. In this embodiment, the identifier $IPC_{j,k}$ varies depending on the position of the field $C_{j,k}$ with respect to the address $@S_j$. Some examples of determining this identifier $IPC_{j,k}$ are described further below. The pointer $PC_{j,k}$ has the same structure as the pointer $PS_j$. It therefore contains the ranges $P_1$ and $P_2$. However, in the case of the pointer $PC_{j,k}$, the range $P_2$ contains the bits of the identifier $IPC_{j,k}$ and the range $P_1$ contains the bits of the starting address $@C_{j,k}$ of the field $C_{j,k}$.

In this embodiment, the vector $iv_{j,k,m}$ is coded on the same number of bits as the pointer PSI.

The module 28 comprises a preprogrammed function $F_{iv}$ that associates a different value of the vector $iv_{j,k,m}$ with each address $@LD_{j,k,m}$ and with each identifier $IPC_{j,k}$. For example, the function $F_{iv}$ is a hash function or encryption function. This therefore gives the following relationship: $iv_{j,k,m} = F_{iv}(@LD_{j,k,m}, IPC_{j,k})$.

The concatenation $CD_{j,k,m}$ here is the concatenation of a datum $D_j$ and of a code $ECC_{Dj,k,m}$.

When the value of the field $C_{j,k}$ is able to be stored in a single line $LD_{j,k,0}$, the datum $D_{j,k,0}$ is equal to this value of the field. In the opposite case, in which the value of the field $C_{j,k}$ is too large to be stored in a single line $LD_{j,k,m}$, then the datum $D_{j,k,m}$ is equal to just part of this value. In the latter case, only combining the various data $D_{j,k,m}$ makes it possible to obtain the complete value of the field $C_{j,k}$. The latter situation occurs in particular when the field $C_{j,k}$ itself is a data structure comprising multiple fields. When the field $C_{j,k}$ is a data structure, it contains at least as many lines $LD_{j,k,m}$ as there are fields in this data structure of rank 1.

The code $ECC_{Dj,k,m}$ is a first integrity tag that makes it possible to check the integrity of the datum $D_{j,k,m}$. More precisely, the code $ECC_{Dj,k,m}$ makes it possible to detect an error in the datum $D_{j,k,m}$ and, here, to correct this error. For example, the code $ECC_{Dj,k,m}$ is the code known by the acronym BCH (Bose, Ray-Chaudhuri, Hocquenghem), which has the advantage of being particularly easy to implement. However, any other known error detection or correction code may be used. The size of the code $ECC_{Dj,k,m}$ is greater than or equal to 1 or 2 or 3 bits, and generally less than $N_{inst}$. The size of the code $ECC_{Dj,k,m}$ is determined depending on the desired robustness. The more it is desired to have the ability to correct a high number of erroneous bits in the datum $D_{j,k,m}$, the larger the size of the code $ECC_{j,k,m}$ will be.

The code $MAC_{j,k,m}$ is a second integrity tag that makes it possible to check the integrity of the line $LD_{j,k,m}$. More precisely, here, the code $MAC_{j,k,m}$ is a code for checking the integrity and the authenticity of the cryptogram $CD_{j,k,m}^*$. This code is commonly called message authentication code and known by the acronym MAC. Such a code $MAC_{j,k,m}$ is obtained by constructing a digital fingerprint from the cryptogram $CD_{j,k,m}^*$. This digital fingerprint normally comprises fewer bits than the cryptogram $CD_{j,k,m}^*$. Such a digital fingerprint is better known as a "digest" or "hash". This digital fingerprint is constructed using a predetermined function and the secret key k known only to the author of the binary code 30 and to the microprocessor 2. Here, the key k is pre-recorded in the memory 29. In addition, in this embodiment, the code $MAC_{j,k,m}$ is also constructed using the address $@LD_{j,k,m}$ and the identifier $IPC_{j,k}$. For example, the predetermined function is a one-way function such as a hash function. In this case, generally, the digital fingerprint is the result of applying this hash function to a combination, for example a concatenation, of the cryptogram $CD_{j,k,m}^*$, of the key k, of the address $@LD_{j,k,m}$ and of the identifier $IPC_{j,k}$.

By way of example, an authenticated encryption algorithm is used in order to generate the cryptogram $CD_{j,k,m}^*$ and the code $MAC_{j,k,m}$. This authenticated encryption algorithm may be chosen from among the various candidates in the CAESAR ("Competition for Authenticated Encryption: Security, Applicability, and Robustness") competition, such as for example one of the algorithms designated by the following names: "ACORN", "ASCON", "SILC", "CLOC", "JAMBU", "KETJE".

The line $LD_{j,k,m}$ may be constructed at the time when the binary code 30 is generated when the address $@LD_{j,k,m}$ is set at the time of compilation. In this case, the compiler first generates the identifier $IPC_{j,k}$ of the pointer $PC_{j,k}$ and then this identifier $IPC_{j,k}$ and the address $@LD_{j,k,m}$ are used to construct the line $LD_{j,k,m}$.

The line $LD_{j,k,m}$ may also be constructed during the execution of the binary code 30. This is the case when the address $@LD_{j,k,m}$ at which the line $LD_{j,k,m}$ should be stored is known only at the time when the binary code 30 is run. For example, this situation arises when the line $LD_{j,k,m}$ is stored in a dynamically allocated memory area in the heap 48.

FIG. 4 shows a method for the execution of the binary code 30 by the microprocessor 2.

The method starts with a step 150 of generating and then providing the binary code 30 in the memory 4. The binary code 30 is typically generated by a compiler, such as the one described with reference to FIG. 6. Providing the binary code 30 here consists in providing the copy 40 and then, for example, the microprocessor 2 stores the copy 40 within the memory 4 in order to obtain the binary code 30 stored in the memory 4. Thus, in step 150, the lines $LD_{j,k,m}$ constructed when the source code is compiled and contained in the binary code 30 are stored in the memory 4 and, generally, in the portion 44.

Next, in a phase 152, the microprocessor 2 executes the binary code 30 and, in particular, the machine code 32.

In a step 162, the module 28 starts by loading the cryptogram ka* contained in the block 34 and by decrypting it using the key $sk_{CPU}$ contained in the memory 29. At the end of step 162, the key ka is contained in the memory 29.

After step 162, the microprocessor 2 executes the instructions of the machine code 32 one after another.

The remainder of the method is described in the particular case of the structure $S_j$ of rank zero. The method is first described in the generic case in which the read, processed or written field is the field $C_{j,k}$ of the structure $S_j$. This description is also illustrated with one example of a data structure called "POINT". The POINT structure is defined by the following lines of code in C language:

```
typedef struct POINT {
    int x;
    int y;
} POINT;
```

The POINT structure comprises two fields "x" and "y". The fields "x" and "y" correspond, respectively, to the fields $C_{j,0}$ and $C_{j,1}$ of the POINT structure.

The data structure is secured each time a step 170 of reading the field $C_{j,k}$ of the structure $S_j$ is executed by the microprocessor 2.

By way of illustration, the execution of step 170 corresponds to the execution of a function get_y( ) that returns the value of the field "y" of the POINT structure when it is executed. In C programming language, the function get_y( ) is defined as follows:

```
int get_y(const POINT* p) {
    return p->y;
}
```

In other words, the function get_y( ) receives, as argument, a pointer "p" that points to a POINT structure and returns, in response, the value of the field "y" of this structure. The pointer "p" is one example of a pointer $PS_j$.

In step 170, the microprocessor 2 executes the following operations in succession.

First of all, in an operation 172, the microprocessor 2 obtains the pointer $PS_j$. For example, in the case of the function get_y( ), the pointer $PS_j$ is passed as argument of the function get_y( ).

Next, in an operation 174, the microprocessor 2 constructs the pointer $PC_{j,k}$ that points directly to the field $C_{j,k}$ to be read of the structure $S_j$. The structure of this pointer $PC_{j,k}$ is identical to that of the pointer $PS_1$. The pointer $PC_{j,k}$ therefore itself also comprises the ranges $P_1$ and $P_2$ of bits. The range $P_1$ contains the bits of the starting address $@C_{j,k}$ of the field $C_{j,k}$ in the address space of the program. The address $@C_{j,k}$ is determined from the address $@S_j$ contained in the pointer $PS_j$ obtained in operation and the position of the field $C_{j,k}$ with respect to the start of the data structure $S_j$.

The range $P_2$ contains the bits of the identifier $IPC_{j,k}$ of this pointer $PC_{j,k}$. The identifier $IPC_{j,k}$ is computed from the identifier $IPS_j$ and an identifier $IC_{j,k}$. The identifier $IC_{j,k}$ is an identifier that uniquely identifies the field $C_{j,k}$ at least among the adjacent fields $C_{j,k-1}$ and $C_{j,k+1}$. Here, the identifier $IC_{j,k}$ uniquely identifies the field $C_{j,k}$ among all of the fields of the structure $S_j$. In this embodiment, the identifier $IC_{j,k}$ is equal to the order number "k" of the field $C_{j,k}$. The identifier $IC_{j,k}$ is therefore equal to k. In this embodiment, the size, in number of bits of the identifier $IC_{j,k}$, is equal to the size of the range $P_2$.

Here, the microprocessor 2 determines the identifier $IPC_{j,k}$ using the following relationship: $IPC_{j,k}=G(IPS_j, IC_{j,k})$. The function G( ) is a function that combines the bits of the identifiers $IPS_j$ and $IC_{j,k}$. For example, here, the function G( ) is the XOR function, that is to say the EXCLUSIVE OR logic function.

Here, the constructed pointer $PC_{j,k}$ is equal to the concatenation of the identifier $IPC_{j,k}$ and of the address $@C_{j,k}$ thus determined.

One example of an algorithm for performing operation 174 is given below in the particular case of the POINT structure and the field "y". In this example, only the construction of the pointer that points directly to the field "y" is shown. The identifier of the field "y" is determined beforehand and taken here to be equal to "1". The determination of the identifier of the field "y" is not shown. This algorithm is written using instructions of the intermediate representation of the LLVM compiler. The instructions of this intermediate representation do not depend on the set of instructions of the microprocessor 2. It is only after compilation that they are translated into instructions of the set of instructions of the microprocessor 2. This description is thus generic in the sense that it may be translated into the set of instructions of any microprocessor for which a translation module has been developed. In technical jargon, this translation module is known by the term LLVM static module. There are numerous translation modules for numerous microprocessors. In particular, there is such a translation module for translating into the set of instructions "RISC-V".

For example, in the LLVM intermediate representation, operation 174 for constructing the pointer %5 that points directly to the field "y" of the POINT structure is coded by the following instructions:

% y=getelementptr inbounds % struct.POINT, % struct-
.POINT* %0, i32 0, i32 1,

580%3=ptrtoint i32* % y to i32

%4=xor i32%3, 0x10000000

%5=inttoptr i32%4 to i32* where:

%0 is a register of the microprocessor 2 storing the pointer "p" that points directly to the start of the POINT structure, "getelementptr" is an instruction of the intermediate representation that returns the address of the field "y" of the POINT structure designated by the pointer contained in the register %0, the last term "i32 1" of the instruction getelementptr specifies that the address returned by this instruction is that of the field "y" and not that of the field "x". To obtain the address of the field "x", it would be necessary to replace the term "i32 1" with the term "i32 0".

% y is a register of the microprocessor 2 storing the starting address of the field "y" of the POINT structure, this address is contained only in the range $P_1$ of least significant bits of the register % y, "ptrtoint" is an instruction of the intermediate representation that converts the address % y into an integer coded on 32 bits, %3 is a register of the microprocessor 2 storing the address of the field "y" in integer form, "xor" is the instruction that performs an EXCLUSIVE OR between the content of the register %3 and the identifier of the field "y" previously computed and coded in the range $P_2$ of most significant bits, 0x10000000 is a 32-bit number, denoted in hexadecimal, containing the identifier of the field "y" in the range $P_2$ and a range $P_1$ containing only zeros, %4 is a register of the microprocessor 2 storing the result of the instruction "xor", "intoptr" is an instruction of the intermediate representation that converts the content of the register %4 into a 32-bit pointer, and %5 is a register of the microprocessor 2 storing the constructed pointer that points directly to the field "y" of the POINT structure designated by the pointer "p" passed as argument of the function get_y( ).

In the above example, the conversion of the pointer into an integer and then the conversion of the content of the register %4 into a pointer are made necessary as the instruction "xor" only works on integers.

To accelerate the execution of operation 174 by the microprocessor 2, in this embodiment, the set of instructions RISC-V of the microprocessor 2 is supplemented by the following instruction: xorptr rd, rs1, imm4. When it is executed by the unit 10, this instruction stores, in a register rd of the microprocessor 2, the result of the EXCLUSIVE OR between the range $P_2$ of most significant bits of the pointer contained in the register rs1 and the bits of the value imm4 coded on $N_P$ bits. Therefore, during compilation, the instruction "%4=xor i32%3, 0x10000000" of the intermediate representation is translated, by the instruction "xorptr %4, %3, 0x1", into the machine language of the microprocessor 2. The unit 10 thus executes this instruction in a single clock cycle. In particular, the use of this new instruction makes it possible to avoid having to construct the number 0x10000000 from the identifier 0x1 of the field "y" prior to executing the EXCLUSIVE OR with the content of the register %3.

In an operation 176, the microprocessor 2 extracts the address @$C_{j,k}$ from the pointer $PC_{j,k}$ constructed in operation 174. For example, for this purpose, the address @$C_{j,k}$ is obtained by masking the bits of the range $P_2$ of bits of the pointer $PC_{j,k}$. This masking operation makes it possible to obtain the same address as if the $N_P$ most significant bits of the pointer $PC_{j,k}$ were to be equal to zero.

Next, the value of the field $C_{j,k}$ is loaded. For this purpose, the various lines $LD_{j,k,m}$ of the field $C_{j,k}$ are loaded one after another. For example, the various lines $LD_{j,k,m}$ are loaded one after another in increasing order of addresses @$LD_{j,k,m}$. To load each line $LD_{j,k,m}$, each time, the microprocessor 2 executes a load instruction having the address @$LD_{j,k,m}$ as operand. The address @$LD_{j,k,m}$ is obtained from the address @$C_{j,k}$ contained in the previously constructed pointer $PC_{j,k}$. More precisely, the address @$LD_{j,k,0}$ of the first line $LD_{j,k,0}$ of the field $C_{j,k}$ is equal to the address @$C_{j,k}$.

Next, the addresses of the following lines $LD_{j,k,m}$ are obtained by incrementing the address @$LD_{j,k,0}$ by a regular increment @P. This regular increment @P is equal to the difference between two addresses of consecutive lines in the memory 4.

For each of the lines $LD_{j,k,m}$, the microprocessor 2 executes the following operations.

In an operation 178, the microprocessor 2 loads the line $LD_{j,k,m}$. For this purpose, it starts by computing the address @$LD_{j,k,m}$ of the line $LD_{j,k,m}$ to be loaded from the extracted address @$C_{j,k}$. For example, the address @$LD_{j,k,m}$ is computed using the following relationship: @$LD_{j,k,m}$=@$C_{j,k}$+m×@P, where the symbol "x" designates the multiplication operation. The computed address @$LD_{j,k,m}$ is then used as operand of the load instruction executed by the unit 10. In response, the memory 4 transmits the line $LD_{j,k,m}$ on the data bus. The received line $LD_{j,k,m}$ is then stored in a register of the microprocessor 2.

Next, in operation 186, the module 28 checks that the identifier $IPC_{j,k}$ contained in the pointer $PC_{j,k}$ constructed in operation 174 corresponds to the identifier $IPC_{j,k}$ associated with the field $C_{j,k}$ when writing this field to the memory 4. Hereinafter, to distinguish between the identifier $IPC_{j,k}$ contained in the pointer $PC_{j,k}$ and the identifier $IPC_{j,k}$ associated with the field $C_{j,k}$ during the write operation, the identifier $IPC_{j,k}$ contained in the pointer $PC_{j,k}$ is denoted $IPC_{j,k}$. Here, the identifier $IPC_{j,k}$ corresponds to the identifier $IPC_{j,k}$ if these two identifiers are the same.

In this embodiment, to check that the identifier $IPC_{j,k}$ corresponds to the identifier $IPC_{j,k}$, the module 28 checks the integrity and the authenticity of the cryptogram $CD_{j,k,m}$* using the code $MAC_{j,k,m}$ contained in the loaded line $LD_{j,k,m}$. To do this, the module 28 constructs a code $MAC_{j,k,m}$ using the same algorithm as the one implemented to construct the code $MAC_{j,k,m}$, except that it uses the cryptogram $CD_{j,k,m}$* loaded in operation 178. In addition, in operation 186, the module 28 uses the identifier $IPC_{j,k}$ and the address @$LD_{j,k,m}$ determined in operation 178. For example, the cryptogram $CD_{j,k,m}$* is concatenated with the key k, the address @$LD_{j,k,m}$ and the identifier $IPC_{j,k}$. The code $MAC_{j,k,m}$ corresponds to the digital fingerprint of this concatenation. If the code $MAC_{j,k,m}$ thus constructed is identical to the loaded code $MAC_{j,k,m}$, then the integrity and the authenticity of the cryptogram $CD_{j,k,m}$* is confirmed. In this case, this means that the identifier $IPC_{j,k}$ used to construct the code $MAC_{j,k,m}$ is the same as the identifier $IPC_{j,k}$ used to construct the code $MAC_{j,k,m}$. The cryptogram $CD_{j,k,m}$* is then stored in a register of the microprocessor. In the opposite case, the check on the integrity of the line $LD_{j,k,m}$ fails and the module 28 moves to a step 182.

In step 182, the module 28 triggers signalling of an execution fault.

By contrast, when the integrity and the authenticity of the cryptogram $CD_{j,k,m}$* is confirmed, the module 28 decrypts it in an operation 188.

In operation 188, the module 28 decrypts the cryptogram $CD_{j,k,m}$* using the key ka, the initialization vector $iv_{j,k,m}$ and the function $f_{ka}^{-1}$ in order to obtain the decrypted concatenation $CD_{j,k,m}$ and therefore the decrypted datum $D_{j,k,m}$ and code $ECC_{Dj,k,m}$. The key ka is the one that was stored in the memory 29 in step 162. In operation 188, the vector $iv_{j,k,m}$ is computed by the module 28 using the relationship: $iv_{j,k,m}$=$F_{iv}$(@$LD_{j,k,m}$; $IPC_{j,k}$), where @$LD_{j,k,m}$ and $IPC_{j,k}$ are the address of the line $LD_{j,k,m}$ and the identifier contained in the range $P_2$ of the pointer $PC_{j,k}$ constructed in step 174.

Once the cryptogram $CD_{j,k,m}$* has been decrypted, in an operation 190, the module 28 records the decrypted datum $D_{j,k,m}$ and the decrypted code $ECC_{Dj,k,m}$ in a register $R_{j,k,m}$, waiting for this datum to be processed by the unit 10.

If the field $C_{j,k}$ still contains a line $LD_{j,k,m}$ to be loaded, then the method returns to step 178. In the opposite case, the securing of the loaded field $C_{j,k}$ ends and the method continues by executing the following instructions of the binary code.

In the case of the POINT structure described here, the field "y" is stored in a single line $LD_{j,1,0}$. Therefore, operations 178, 186 and 188 are executed just once.

Operation 186 makes it possible to validate the integrity and the authenticity of each loaded line $LD_{j,k,m}$. In particular, operation 186 makes it possible to detect replacement of the line $LD_{j,k,m}$ with a new data line constructed by an author who does not know the key k. Operation 186 also makes it possible to detect the permutation of the line $LD_{j,k,m}$ with another line $LD_x$ stored at an address @x located outside the field $C_{j,k}$.

Operation 186 also makes it possible to detect virtually any erroneous uses of a pointer. For example, operation 186 detects incorrect use of a pointer $PD_x$ to read the line $LD_{j,k,m}$ or to replace the line $LD_{j,k,m}$ with a new line $LD_x$. More precisely, if another pointer $PD_x$, different from the pointer $PC_{j,k}$, is used to read the line $LD_{j,k,m}$, the identifier $IP_x$ contained in the pointer $PD_x$ is different from the identifier $IPC_{j,k}$. Since it is the identifier $IP_x$ that is used to construct the code $MAC_{j,k,m}$, the constructed code $MAC_{j,k,m}$ is different from the code $MAC_{j,k,m}$. This erroneous use of the pointer $PD_x$ therefore triggers the signalling of an execution fault. If the pointer $PD_x$ is used to write a line $LD_x$ in place of the line $LD_{j,k,m}$, then the code $MAC_j$ of the line $LD_x$ is constructed using the identifier $IP_x$. Next, during subsequent use of the pointer $PC_{j,k}$, the constructed code $MAC_{j,k,m}'$ is different from the code $MAC_j$ since it is the identifier $IPC_{j,k}$, and not the identifier $IP_j$, that is used. This erroneous use of the pointer $PD_x$ is therefore also detected. By virtue thereof, stack overflow attacks are detected. In particular, if the pointer $IP_x$ used to write the line $LD_{j,k,m}$ is the pointer $PC_{j,k-1}$ used to write a value to the adjacent field $C_{j,k-1}$ of the same structure $S_j$, then the identifier $IPC_{j,k-1}$ is different from the identifier $IPC_{j,k}$. Specifically, the identifier $IC_{j,k-1}$ is different from the identifier $IC_{j,k}$. Thus, by virtue of using field identifiers to construct each pointer $PC_{j,k}$, it is possible to detect the value of a field of the structure $S_j$ being carried over onto another field of this same structure $S_j$.

Operation 186 also makes it possible to detect the use of the pointer $PC_{j,k}$ after the memory area containing the line $LD_{j,k,m}$ has been freed up. Specifically, typically, after this memory area is freed up, it is reused to store other data lines therein. To reuse this memory area, a new pointer $PD_x$ is generated and then used to store these other lines $LD_x$. This new pointer $PD_x$ comprises an identifier $IP_x$ different from the identifier $IPC_{j,k}$. Next, if the pointer $PS_j$ or $PC_{j,k}$ is used to read the line $LD_x$, this is detected. Specifically, in this case too, the constructed code $MAC_{j,k,m}$ will be different from the code $MAC_j$ of the line $LD_j$. Operation 186 thus allows attacks using dangling pointers or use-after-free attacks to be detected.

When the next instruction that will be executed by the unit 10 is an instruction that processes the datum $D_{j,k,m}$ of the field $C_{j,k}$, the module 28 moves to operations 194 and 196. The module 28 identifies that the next instruction to be executed will process the datum $D_{j,k,m}$, since this instruction generally contains an operand that identifies the register $R_{j,k,m}$ in which the datum $D_{j,k,m}$ is stored.

In operation 194, the module 28 checks the integrity of the datum $D_{j,k,m}$ again. More precisely, it checks whether there is an error in the datum $D_{j,k,m}$ contained in the register $R_{j,k,m}$ using the code $ECC_{Dj,k,m}$ also contained in this register $R_{j,k,m}$. This operation 194 makes it possible to detect a fault injection attack in the register $R_{j,k,m}$.

If the module 28 detects an error, then it moves immediately to step 182. In addition, in parallel, in an operation 196, the module 28 corrects the datum $D_{j,k,m}$ using the code $ECC_{Dj,k,m}$. The processing of the datum $D_{j,k,m}$ may thus be continued even if an error is detected.

It will be noted that, in one embodiment in which operation 186 is omitted, operation 194 also makes it possible to detect the same erroneous uses of pointers as those able to be detected in operation 186. Specifically, the datum $D_{j,k,m}$ and the code $ECC_{Dj,k,m}$ were obtained by decrypting the cryptogram $CD_{j,k,m}*$, in particular using the identifier $IPC_{j,k}$ of the pointer constructed in operation 174. Therefore, if the pointer constructed in this operation 174 is not the pointer $PC_{j,k}$ but another, different pointer $PD_x$, the datum $D_{j,k,m}$ decrypted and the code $ECC_{Dj,k,m}$ decrypted in operation are incorrect and the check on the integrity of the line $LD_{j,k,m}$ in operation 194 therefore fails.

Next, at the end of operation 196, or if no error was detected in operation 194, the unit 10 executes the instruction that processes the datum $D_{j,k,m}$.

In parallel, each time the unit 10 executes an instruction that leads to a new datum $D_{j,k,m}$ being stored in a register, denoted $R_{j,k,m}$ here, of the set 12, the module 28 constructs the concatenation $CD_{j,k,m}$ and stores it in the register $R_{j,k,m}$. Subsequently, the unit 10 executes a step 200 of writing the field $C_{j,k}$ to the memory 4. For example, if the structure $S_j$ is the POINT structure defined above, this writing step corresponds to the execution of the following function written in C language:

```
write_y(const POINT* p; val) {
    p->y = Val;
}
```

The execution of this function write_y( ) by the microprocessor 2 causes the value "val" to be stored in the field "y" of the POINT structure pointed to by the pointer "p". The pointer "p" and the value "val" are passed here as argument of the function write_y( ).

In step 200, the microprocessor 2 begins by executing the following operations:

in an operation 202, it obtains the pointer $PS_j$, and then
in an operation 204, it constructs the pointer $PC_{j,k}$ that points directly to the field $C_{j,k}$ of the structure $S_j$.

The pointer $PS_j$ was generated prior to the execution of operation 202. For example, it is defined statically in the binary code 30 or generated in response to the execution of a function for dynamically allocating a memory area, for example in the heap 48, for storing the structure $S_j$ therein.

In operation 202, in the case of the function write_y( ), the data structure pointer "p" is obtained from the arguments of this function.

Operation 204 is identical to operation 174.

In an operation 206, the microprocessor 2 extracts the address $@C_{j,k}$ from the pointer $PC_{j,k}$ constructed in operation 204. This operation is for example identical to operation 176. In this operation, the identifier $IPC_{j,k}$ is also extracted from the pointer $PC_{j,k}$.

Next, the various lines $LD_{j,k,m}$ of the field $C_{j,k}$ are written to the memory 4 one after another. For this purpose, the following operations are executed for each datum $D_{j,k,m}$ of the field $C_{j,k}$.

In an operation 208, the module 28 constructs the address @$LD_{j,k,m}$ of the line $LD_{j,k,m}$ from the address @$C_{j,k}$ extracted in operation 206. For example, this is carried out as described in the case of operation 178.

Next, in an operation 216, the module 28 constructs the data line $LD_{j,k,m}$ that has to be stored at the address @$LD_{j,k,m}$. For this purpose, the module 28:

obtains or constructs the concatenation $CD_{j,k,m}$, and then computes the vector $iv_{j,k,m}$ using the relationship: $iv_{j,k,m}=F_{iv}(@LD_{j,k,m}, IPC_{j,k})$, and then constructs the cryptogram $CD_{j,k,m}*$ using the relationship $CD_{j,k,m}*=f_{ka}(CD_{j,k,m}; iv_{j,k,m})$, and then computes the code $MAC_{j,k,m}$ using the cryptogram $CD_{j,k,m}*$, the key k', the address @$LD_{j,k,m}$ and the identifier $IPC_{j,k}$, and then concatenates the cryptogram $CD_{j,k,m}*$ and the code $MAC_{j,k,m}$ so as to form the line $LD_{j,k,m}$.

Next, in an operation 218, the microprocessor 2 stores the constructed line $LD_{j,k,m}$ in the memory 4 at the address @$LD_{j,k,m}$. Storing the code $MAC_{j,k,m}$ associated with the cryptogram $CD_{j,k,m}*$ makes it possible to store, in the memory 4, the association between the field $C_{j,k}$ and the identifier $IPC_{j,k}$ as the code $MAC_{j,k,m}$ was computed using this identifier $IPC_{j,k}$.

If the field $C_{j,k}$ contains other data $D_{j,k,m}$ to be written, then the method returns to step 208. In the opposite case, writing step 200 ends and the method continues by executing the following instructions of the binary code.

In the case of the POINT structure described here, the field "y" is stored in a single line $LD_{j,1,0}$. Therefore, operations 208, 216 and 218 are executed just once.

When the binary code is executed, if erroneous use of a data structure pointer occurs, the microprocessor 2 signals a fault in the execution of the binary code 30 in step 182. In response to such signalling, in a step 230, the microprocessor 2 implements one or more countermeasures. A wide range of countermeasures are possible. The countermeasures implemented may have very different degrees of severity. For example, the countermeasures implemented may range from simply displaying or simply storing in memory an error message without interrupting the normal execution of the binary code, right up to definitively disabling the microprocessor 2. The microprocessor 2 is considered to be disabled when it is definitively put into a state in which it is incapable of executing any binary code. Between these extreme degrees of severity, there are many other possible countermeasures, such as those cited in application EP3761199A1.

In addition, in this case, the countermeasure implemented in step 230 may be selected depending on the detected error and therefore depending on the operation that led to the detection of this fault. For example, the selected countermeasure will not be the same depending on whether the error was detected in operation 186 or 194.

Everything that has been described here in the particular case of a structure $S_1$ of rank 0 applies to a structure of rank greater than zero. For example, if the field $C_{j,k}$ itself is a data structure $S1_k$ then everything that has been described above is executed for the structure $S1_k$ of rank 1 and not for the structure $S_j$ of rank 0. More precisely, in this case, it is the pointer $PC_{j,k}$ that takes on the role of a pointer pointing to the data structure $S1_k$. This is made possible since the structure of the pointer $PC_{j,k}$ is identical to the structure of a data structure pointer. The pointer $PC_{j,k}$ is constructed as described with reference to operation 174. Therefore, when operation 174 is executed for the structure $S1_k$, a pointer $PC1_k$ that points directly to the starting address of a field $C1_{k,n}$ to be read of the structure $S1_k$ is constructed from the pointer $PC_{j,k}$. The identifier $IPC1_{k,n}$ of this pointer $PC1_{k,n}$ is constructed from the identifier $IPC_{j,k}$ and an identifier $IC1_{k,n}$ of the field $C1_{k,n}$. The value of the constructed identifier $IPC1_{k,n}$ thus depends on the value of the identifiers $IPS_j$, $IC_{j,k}$ and $IC1_{k,n}$. Specifically, the value of the identifier $IPC_{j,k}$ depends on the value of the identifier $IC_{j,k}$. It should be noted that the instruction xorptr described above is then executed recursively so as to successively construct the pointer $PC_{j,k}$ and then the pointer $PC1_{k,n}$. This teaching also makes it possible to deal with the case of data structures of rank greater than one. In this case, the field pointer identifier constructed for a field of a structure of rank greater than one is a function of all of the field identifiers of the structures of lower ranks and of the identifier $IPS_j$ of the structure of rank 0.

Second Embodiment

Other methods exist for creating the association between the identifier $IPC_{j,k}$ and the field $C_{j,k}$ and storing this association. In particular, to do this, it is not necessary to use the code $MAC_{j,k,m}$ of the lines $LD_{j,k,m}$. This section presents a second way of doing this.

To accelerate data transfers between the memory 4 and the microprocessor 2, it is possible to perform these transfers in blocks of multiple data, rather than transferring each datum individually. In this case, each block of data is stored in the memory 4 in the form of a block of encrypted and authenticated data. Such a block of encrypted and authenticated data in particular comprises:

a cryptogram of the block of cleartext data,
metadata, and
a code for authenticating the cryptogram and the metadata.

For example, the encryption function used to obtain the cryptogram of the block of cleartext data is the same function $f_{ka}$ as the one used in the first embodiment. Here, by way of illustration, the function $f_{ka}$ is a block cipher. The cryptogram of the block of cleartext data then is obtained by processing the block of data as a single block of bits and without distinguishing between the data. Thus, to obtain this cryptogram, a single encryption operation is executed instead of one encryption operation for each datum of this block of data. However, the cryptogram is able to be decrypted only in a single decryption operation. In particular, it is not possible to decrypt only some of the data without decrypting the whole cryptogram.

Similarly, the authentication code is common to all of the data of the block of data. It is therefore computed in a single operation in which the block of data is processed as a single block. This thus avoids the need to construct one authentication code for each datum of this block of data. This accelerates the construction of the authentication code.

The use and the operation of such blocks of encrypted and authenticated data are described in the American application filed on Feb. 12, 2020 under Ser. No. 17/109,424. The reader may thus consult this application for the basic knowledge regarding the operation and use of such blocks. Hereinafter, only specific adaptations of these blocks for implementing the method of FIG. 5 are described.

In such a context, one or more of the data of the block of data may be data $D_{j,k,m}$ that belong to the field $C_{j,k}$ of the structure $S_j$. In this case, the identifier $IPC_{j,k}$ associated with each datum $D_{j,k,m}$ of the block is recorded in the metadata at a location associated with the datum $D_{j,k,m}$. The authentication code of the block of encrypted and authenticated data is for its part computed from the cryptogram of the data of the block and, preferably, also from the metadata.

The method of FIG. 5 is identical to the method of FIG. 4, except that operations 178, 186, 208, 216 and 218 are replaced, respectively, by operations 378, 386, 308, 316 and 318.

When the field $C_{j,k}$ is read, operation 178 is replaced with operation 378 of loading the datum $D_{j,k,m}$ located at the address @$D_{j,k,m}$. The address @$D_{j,k,m}$ is computed from the address @$C_{j,k}$ extracted in operation 176. For example, for this purpose, the same procedure as described above is used to compute the address @$LD_{j,k,m}$, except that the increment @P is equal to the difference between two successive data of the field $C_{j,k}$. From the address @$D_{j,k,m}$, the module 28 identifies the block of encrypted and authenticated data containing this datum $D_{j,k,m}$. It is this whole block that is then loaded into registers or a memory of the microprocessor 2.

In operation 386, the module 28 checks that the identifier $IPC_{j,k}$ contained in the pointer $PC_{j,k}$ constructed in operation 174 corresponds to the identifier $IPC_{j,k}$ associated with the datum $D_{j,k,m}$ in the block loaded in operation 378. For this purpose, in this embodiment, the microprocessor extracts the identifier $IPC_{j,k}$ contained in the metadata of the loaded block and associated with the datum $D_{j,k,m}$. It then compares it with the identifier $IPC_{j,k,m}$. If these two identifiers match, then the method continues with operation 188. In the opposite case, the method continues with step 182.

When the field $C_{j,k}$ is written to the memory 4, the microprocessor 2 writes each datum $D_{j,k,m}$ of this field to the memory 4. The difference in comparison with the embodiment of FIG. 4 is that, here, writing a datum $D_{j,k,m}$ to the memory 4 consists in generating a block of encrypted and authenticated data that contains this datum $D_{j,k,m}$ and then in storing this generated block of data in the memory 4.

Thus, in operation 308, the module 28 constructs the address @$D_{j,k,m}$ of each datum to be stored. For example, for this purpose, it uses the same procedure as in operation 378.

Next, in operation 316, the module 28 constructs a block B of encrypted and authenticated data containing the datum $D_{j,k,m}$. For this purpose, the module 28:
- encrypts the block of multiple cleartext data containing the datum $D_{j,k,m}$ in order to obtain a cryptogram BD* of these data,
- introduces, into the metadata MD of this block, the identifier $IPC_{j,k}$ at the location reserved for this purpose and associated with the datum $D_{j,k,m}$, and then
- computes an authentication code MAC of the block B using the cryptogram BD* and the metadata MD.

In operation 318, the block B constructed in operation 316 is stored in the memory 4.

If multiple data $D_{j,k,m}$ belong to the same block B of encrypted and authenticated data, operations 308, 316 and 318 are executed just once for this set of data $D_{j,k,m}$. By contrast, if the data $D_{j,k,m}$ do not all belong to the same block of encrypted and authenticated data, then operations 308, 316 and 318 are reiterated as many times as there are blocks to be constructed and stored.

Section IV: Generation of the Binary Code

FIG. 6 shows a compiler 300 able to automatically generate the binary code from a source code 302. To this end, the compiler 300 typically comprises a programmable microprocessor 304 and a memory 306. The memory 306 contains the instructions and data required to automatically generate, when they are executed by the microprocessor 304, the binary code 30 from the source code 302. In particular, when the source code 302 is compiled, the microprocessor 304 automatically generates the pointers $PS_j$ for each defined data structure $S_j$, for example as a static data structure or as a global variable. In particular, in the compilation, the compiler generates the corresponding identifier $IPS_j$ for each of these pointers PSI. Next, the compiler constructs the pointer $PC_{j,k}$, as described with reference to operation 174 or 204, for each field $C_{j,k}$ of these structures $S_j$. Finally, if initial values are assigned to these fields $C_{j,k}$, the compiler generates the lines $LD_{j,k,m}$ that contain these values as described in the case of step 200. It is within the ability of a person skilled in the art to design and produce such a compiler, based on the explanations given in this description. For example, for this purpose, the compiler 30 automatically recognizes and identifies the fields that are accessed using data structure pointers. For example, the compiler 300 is a compiler using the LLVM abstraction layer.

Section V: Variants

Variants of the Field Identifier:

The field identifier $IC_{j,k}$ may be obtained in various ways. For example, as a variant, the identifier $IC_{j,k}$ is computed using the following relationship: $IC_{j,k} = (@C_{j,k} - @S_j)$ modulo (NbBitIP), where:
- $(@C_{j,k} - @S_j)$ is the difference between the starting address of the structure $S_1$ and the starting address of the field $C_{j,k}$,
- "modulo" is the modulo arithmetic operation that associates the remainder of the Euclidean division of a by b with the pair (a, b) of integers,
- NbBitIP is equal to the number of possible values for a pointer identifier.

Here, NbBitIP is equal to $2^{Np}$.

In another embodiment, the identifier $IC_{j,k}$ is obtained through a random draw. In this case, for each structure $S_j$, a table associating each field $C_{j,k}$ with its identifier $IC_{j,k}$ is stored in the memory 4. When the pointer $IPC_{j,k}$ is constructed, the microprocessor 2 reads the identifier $IC_{j,k}$ that is associated with this field $C_{j,k}$ in this table.

Functions GO other than EXCLUSIVE OR may be used to compute the identifier $IPC_{j,k}$ from the identifiers $IPS_j$ and $IC_{j,k}$. In fact, any other function that retains the diversity of the bits of the range $P_2$ when it is applied to these bits multiple times may be used. For example, as a variant, the function Go is a hash function applied to the concatenation of the identifiers $IPS_j$ and $IC_{j,k}$.

Variants of the Data Lines $LD_{j,k,m}$:

The various variants described in the chapter "Variants of securing the data" in application EP3761199A1 may easily be transposed to the context of the present application.

For example, the code $ECC_{j,k,m}$ may be replaced with a simple error detection code only for detecting an error in the datum $D_{j,k,m}$. An error detection code does not make it possible to correct the detected error. In this case, error correction operation 196 is omitted.

In one simplified variant, the code $ECC_{Dj,k,m}$ is omitted. In this embodiment, the microprocessor 2 is no longer capable of detecting an error in the decryption of the cryptogram $CD_{j,k,m}*$ or a modification of the datum $D_{j,k,m}$ that occurs after it has been decrypted and before it is processed by the unit 10. In this case, operations 194 and 196 are omitted.

In one simplified variant, the cryptogram $CD_{j,k,m}*$ is constructed without using the identifier $IPC_{j,k}$ and/or without using the address @$LD_{j,k,m}$. When the identifier $IPC_{j,k}$ is not used to construct the cryptogram $CD_{j,k,m}^*$, then only the code $MAC_{j,k,m}$ makes it possible to detect erroneous use of a pointer.

The code $MAC_{j,k,m}$ may also be constructed without taking into account the address $@LD_{j,k,m}$ of the line. If this embodiment is combined with the variant in the previous paragraph, then some lines $LD_{j,k,m}$ of the field $C_{j,k}$ may be switched without this being able to be detected.

Numerous embodiments of the function $f_{ka}$ are possible. For example, the functions $f_{ka}$ and $f_{ka}^{-1}$ may also be encryption/decryption algorithms in which the vector $iv_{j,k,m}$ is not used. Everything that has been described here then applies in the same way to such an encryption/decryption algorithm by simply replacing the term "initialization vector" with the term "key".

As a variant, in the second embodiment, the encryption function $f_{ka}$ is a symmetric encryption function that encrypts the data of the block of cleartext data one after another in a predetermined order. In this case, the cryptogram that is obtained must also be decrypted in the same predetermined order. Thus, in this case, from this cryptogram, the function $f_{ka}^{-1}$ only allows the cleartext data to be obtained, one after another, in the predetermined order. For example, this function $f_{ka}$ is a stream cipher. This function $f_{ka}$ is then initialized with the vector $iv_i$ at the start of the encryption of each block of cleartext data.

If the function $f_{ka}^{-1}$ allows the data to be obtained one after another, in one advantageous embodiment, the metadata and, in particular, the vector $iv_i$ are located at the start of the block of encrypted and authenticated data such that the vector $iv_i$ is loaded into the microprocessor first. In this case, the module 28 may start to decrypt the cryptogram while it is being received without waiting for this cryptogram to be completely loaded into the microprocessor. This is advantageous when the size of the cryptogram is larger than the size of the data bus used to transfer it to the microprocessor. Specifically, in such a situation, the cryptogram is transferred to the microprocessor in successive chunks. It is therefore necessary to execute, one after another, multiple transfer operations between the memory 4 and the microprocessor in order to transfer the complete cryptogram. When the vector $iv_i$ is received first, decryption of the first received chunk of the cryptogram may start before the following chunk of the cryptogram is received. Executing the function $f_{ka}^{-1}$ thus makes it possible to obtain, in the predetermined order, first the first datum, then the second datum, and so on up to the last datum. In this embodiment, the operation of loading the block of encrypted and authenticated data and the operation of decrypting the cryptogram may be partially performed in parallel. Advantageously, in this embodiment, to save even more time, a datum that has just been decrypted may be used and processed by the microprocessor before the authentication code of the block has been checked. If the check on the integrity of the block subsequently fails, then operation 182 is immediately triggered. If by contrast the check on the integrity of the block subsequently succeeds, then it is authorized to continue using the data of the block of cleartext data.

As a variant, the function $F_{iv}$ is identical to the function $f_{ka}$ except that it is applied to the address $@LD_{j,k,m}$ and to the identifier $IPC_{j,k}$. The function Fi, may also use the same encryption algorithm as the function $f_{ka}$ but with an encryption key different from the key ka.

In one simplified variant, the function $F_{iv}$ is the identity function. In this case, the vector $iv_{j,k,m}$ is for example systematically the same as the pointer $PC_{j,k}$.

As a variant, each line $LD_{j,k,m}$ may additionally contain a code $ECC_{Lj,k,m}$. The code $ECC_{Lj,k,m}$ is an error correction code that makes it possible to detect and correct an error in the cryptogram $CD_{j,k,m}^*$ and the code $MAC_{j,k,m}$. It is for example constructed and used as described in application EP3761199A1.

To detect erroneous use of the pointer PSI, just one of the code $MAC_{j,k,m}$ and the code $ECC_{Dj,k,m}$ is necessary. Thus, in one simplified embodiment, the code $MAC_{j,k,m}$ is omitted and step 186 is omitted. In another simplified embodiment, it is the code $ECC_{j,k,m}$ that is omitted and steps 194 and 196 are omitted.

The number of bits and the location of the bits of the range $P_2$ may be modified. For example, the range $P_2$ corresponds to the least significant bits of the pointers. In this case, it is necessary to adapt the mask that is used in order to extract, respectively, the pointer identifier and the address in this pointer.

Variants of the Method for Securing the Data Structures:

Other embodiments of operation 186 or 386 are possible. For example, in operation 186 or 386, the identifiers $IPC_{j,k}$ and $IPC_{j,k}$ are said to match if the difference between these two identifiers is lower, in terms of absolute value, than a predetermined threshold.

As a variant, operation 186 continues systematically with operation 188, even if the integrity or the authenticity of the cryptogram has not been able to be confirmed. In this case, operation 186 serves to trigger signalling of an execution fault without interrupting the execution of the binary code.

It is not necessary for the structures of the pointers $PS_j$ and $PC_{j,k}$ to be identical. If the structures of the pointers $PS_j$ and $PC_{j,k}$ are different, then operation cannot simply be reiterated using the pointer $PC_{j,k}$ as a pointer pointing to a data structure of higher rank. For example, in this case, only the carrying over of the value of the field $C_{j,k}$ onto one of the adjacent fields of the structure $S_j$ is implemented.

What has been described here is not necessarily implemented for all data structures. For example, for some data structures, security is deactivated. For this purpose, the identifier $IPS_j$ and the identifiers $IC_{j,k}$ of each field of this data structure are zero. The activation and/or the deactivation of the securing of some data structures are for example programmed by adding a specific activation instruction, and alternately deactivation instruction, associated with this data structure to the source code.

In other embodiments, the data structures are secured only for data structures stored in a specific portion of the memory 4. For example, the structures are secured only for data structures stored in the stack 46 or the heap 48. For this purpose, the method of FIG. 4 or 5 is implemented only if the data structure is stored in the stack 46 or the heap 48. The method of FIG. 4 or 5 may also be implemented only for data structures stored in the portion 44 of the memory.

Other Variants:

Other embodiments of the apparatus 1 are possible. In particular, all of the variants described in paragraphs 191 to 194 of application EP3457620A1 are applicable here.

The module 28 may be replaced with a software module that, when it is executed by the unit 10, performs the same functions and operations as those described for the module 28.

What has been described here also applies in a context in which no virtual memory mechanism is implemented. In this case, no virtual address is used, and only the physical addresses are used.

A data line may be longer than a data word. In this case, each data line is formed of multiple data words that are generally located at immediately consecutive memory addresses in the memory 4. In this case, a data line is loaded into the microprocessor 2 not in one single read operation, but by executing multiple read operations. Each read operation loads a respective data word of the data line into the microprocessor.

All of the embodiments described in this text and, in particular, the various variants, may be combined with one another.

Section V: Advantages of the Described Embodiments

The embodiments described here make it possible to detect any erroneous uses of a pointer that are detected using the method described in application EP3761199A1. For example, the methods described here make it possible to detect attacks that use invalid pointers, such as dangling pointers, and to detect stack overflow attacks or stack underflow attacks. On the other hand, in contrast to the method of application EP3761199A1, the methods described here additionally make it possible to detect the carrying over of the value of a field of a data structure onto the adjacent fields of this same data structure. In addition, to do this, the described embodiments retain the possibilities of explicitly defining just one data structure pointer $PS_j$ for manipulating each of the fields $C_{j,k}$ of the structure $S_j$. The functions that read or write the fields $C_{j,k}$ thus receive, as argument, only the pointer $PS_j$ and not the pointers $PC_{j,k}$. Lastly, since the identifier $IPC_{j,k}$ is constructed from the identifier $IPS_j$, this identifier $IPC_{j,k}$ is specific to the structure $S_j$. The pointer $PC_{j,k}$ therefore cannot be used to read a field in another data structure, even if its definition is identical to that of the structure $S_j$.

The fact that the ranges $P_1$ and $P_2$ are located at the same locations in the data structure pointers and in the field pointers makes it possible to construct the pointer $PC1_{k,n}$ pointing to a field $C1_{k,n}$ of a data structure $S1_k$ of rank 1 by executing the same operations as those executed to construct the pointer $PC_{j,k}$ that points directly to this structure $S1_k$. This makes it much easier to implement the described methods if the data structure is embedded within one or more other data structures of lower rank. The described methods thus easily make it possible to secure the data structures embedded within one another.

Determining the identifier $C_{j,k}$ from the position of the field $C_{j,k}$ in the structure $S_1$ makes it possible to avoid using a table that associates each field of a data structure and its identifier. Specifically, the position of the field $C_{j,k}$ with respect to the starting address $@S_j$ of the structure $S_j$ is deduced from the declaration of the type of pointer $PS_j$.

The fact that the identifier $IC_{j,0}$ is zero simplifies the construction of the pointer $PC_{j,0}$ since, in this case, the pointer $PC_{j,0}$ is the same as the pointer $PS_j$.

Generating the pointer $PS_j$ in response to the execution of an instruction to dynamically allocate a memory area makes it possible to implement the described method if the data structure is stored in a memory area dynamically allocated during the execution of the binary code.

The fact that the sizes of the pointers $PS_j$ and $PC_{j,k}$ are equal to the size of an address makes it possible to load and to manipulate these enriched pointers like a conventional address and therefore with a minimum number of instructions. In particular, it is not necessary to add additional instructions to read or write the identifier of the pointer from or to the memory 4.

The invention claimed is:

1. A method for execution of a binary code of a computer program by a microprocessor, said binary code defining a data structure comprising multiple fields able to be accessed independently of one another, including a particular field to be read using a pointer, said method comprising:
 (a) writing, to a main memory, a value of the particular field, which is associated with a first field pointer identifier, said first field pointer identifier identifying a field pointer to be used to read the value of said particular field, and
 (b) reading the value of said particular field of the data structure from the main memory, said reading step comprising the following operations:
  (b1) obtaining a data structure pointer that points to a start of the data structure, said data structure pointer containing a first range of bits containing a starting address of the data structure in an address space of the computer program, and a second, different range of bits containing a data structure pointer identifier, said data structure pointer identifier to uniquely identifying said data structure pointer among a set containing multiple different data structure pointers implemented in a same execution of the binary code by said microprocessor,
  (b2) constructing the field pointer that points directly to the particular field of the data structure to be read, said field pointer containing a first range of bits containing a starting address of the particular field in the address space of the computer program, and a second range of bits containing a second field pointer identifier, said constructing operation (b2) comprising the following sub-operations:
   (b2.1) determining the starting address of the particular field from the starting address contained in the first range of bits of the data structure pointer and a position of the particular field with respect to the start of the data structure, and
   (b2.2) determining the second field pointer identifier from the data structure pointer identifier contained in the second range of bits of the data structure pointer obtained in operation (b1),
  (b3) loading, from the main memory, the value of the particular field using the address contained in the first range of bits of the field pointer constructed in operation (b2), and
  (b4) checking that the second field identifier contained in the second range of bits of the field pointer constructed in operation (b2) corresponds to the first field pointer identifier associated with the particular field when said value is written to the main memory, and when the first and second field pointer identifiers do not match, triggering a signalling of an execution fault, and when the first and second field point identifiers match, suppressing the triggering of the signalling of an execution fault and processing, with the microprocessor, the loaded value of the particular field,
 wherein in step (a), the first field pointer identifier associated with the particular field is determined from the data structure pointer identifier and from an identifier of the particular field that differs for all fields of the data structure that are adjacent to the particular field to be read, and
 in operation (b2), the second field pointer identifier is additionally determined from the same identifier of the particular field in order to obtain the second field pointer identifier that systematically corresponds to the first field pointer identifier when the data structure pointer identifier is identical to one used to determine the first field pointer identifier.

2. The method according to claim 1, wherein:
structures of the data structure pointer and of the field pointers are identical, and
locations of the first and second ranges of bits in the data structure pointer and in the field pointers are identical.

3. The method according to claim 2, wherein:
a data structure of higher rank is embedded within a data structure of lower rank, said data structure of higher rank corresponding to a first particular field of the data structure of lower rank and the data structure of higher rank comprising a second particular field to be read using a pointer,
operations (b1) and (b2) are executed a first time for the data structure of lower rank and for said first particular field in order to obtain a first field pointer that points directly to a start of the first particular field, and then operations (b1) and (b2) are executed a second time for the data structure of higher rank and for the second particular field in order to obtain a second field pointer that points directly to a start of the second particular field,
in the first execution of operation (b1), the data structure pointer points to the start of the data structure of lower rank,
in the first execution of operation (b2), a first identifier of the first particular field is used to construct the first field pointer,
in the second execution of operation (b1) for the data structure of lower rank, the data structure pointer that is obtained is identical to the first field pointer constructed in the first execution of operation (b2),
in the second execution of operation (b2), a second identifier of the second field is used to construct the second field pointer, and
operations (b3) and (b4) are executed using the starting address and the second field pointer identifier contained, respectively, in the first and second ranges of bits of the second field pointer constructed in the second execution of operation (b2).

4. The method according to claim 1, wherein sub-operation (b2.2) comprises determining the second field identifier from the position of the particular field with respect to the start of the data structure.

5. The method according to claim 4, wherein, when the particular field is a first field of the data structure, the second identifier of said particular field is systematically zero, such that the field pointer identifier constructed for said particular field is identical to the data structure pointer identifier contained in the second range of bits of the data structure pointer.

6. The method according to claim 1, wherein step (a) comprises operations of:
(a1) obtaining the data structure pointer that points to the start of the data structure,
(a2) determining the first field pointer identifier from the data structure pointer identifier contained in the second range of bits of the data structure pointer obtained in operation (a1), and the identifier of the particular field, and
(a3) storing, in the main memory, the value of the particular field associated with the first field pointer identifier determined in operation (a2).

7. The method according to claim 6, wherein operation (a1) comprises:
the microprocessor executing an instruction to dynamically allocate a memory area in order to store the data structure therein, said allocation instruction being contained in the binary code of the computer program, and
in response:
reserving, in the address space of the computer program, a memory area of a size equal to a size of the data structure, to and from which the microprocessor is able to write and read the values of the fields of said data structure, and
generating the data structure pointer that contains, in the first range of bits, the starting address of the reserved memory area and, in the second range of bits, the data structure pointer identifier.

8. The method according to claim 6, wherein:
step (a) further comprises:
constructing one or more cryptograms from the value of the particular field to be written,
computing one or more first tags for checking an integrity of each of the constructed cryptograms, said first tag being computed from the constructed cryptogram and using the first field pointer identifier in order to form an association between said particular field and said first field pointer identifier, and
storing, in the main memory, the one or more constructed cryptograms and the one or more computed tags at locations associated with one another,
operation (b3) comprises, for each cryptogram stored in step (a), loading said cryptogram and the first integrity tag associated with said cryptogram from the main memory using the address contained in the first range of bits of the field pointer constructed in operation (b2),
operation (b4) comprises checking the integrity of each loaded cryptogram, said checking comprising:
constructing a second integrity tag from the loaded cryptogram and the field pointer identifier contained in the second range of bits of the field pointer constructed in operation (b2),
comparing said second integrity tag with the loaded first integrity tag, and
when the second integrity tag does not correspond to the first integrity tag and the check on the integrity of the loaded cryptogram fails, the microprocessor systematically triggers the signalling of an execution fault, and when the second integrity tag corresponds to the first integrity tag and the loaded cryptogram exhibits integrity, the loaded cryptogram is decrypted in order to obtain a cleartext value of the field and the triggering of an execution fault is suppressed.

9. The method according to claim 6, wherein:
step (a) further comprises storing, in the main memory, one or more blocks of encrypted and authenticated data containing the value of the particular field, each block of encrypted and authenticated data containing:
a cryptogram of all of the data of said block, said cryptogram having to be entirely decrypted to obtain a block of cleartext data,
an authentication code computed from the cryptogram of the block of cleartext data, and
metadata comprising the first field pointer identifier associated with the particular field,
operation (b3) comprises loading, from the main memory, each block of encrypted and authenticated data containing the value of the particular field using the address contained in the first range of bits of the field pointer constructed in operation (b2), operation (b4) comprises, for each block loaded in operation (b3), checking that the second field pointer identifier contained in the second range of bits of the field pointer constructed in operation (b2) corresponds to the first field pointer identifier associated with the value of the particular field and contained in the metadata of the loaded block, and when the first and second field pointer identifiers do not match, triggering the signalling of an execution fault, and when the first and second field pointer identifiers match, suppressing the triggering of the signalling of an execution fault and processing, with the microprocessor, the loaded value of the particular field.

10. The method according to claim 1, wherein sizes of the data structure pointer and of each field pointer, in number of bits, are equal to a maximum number of bits able to be contained by an address transferred from the microprocessor to the main memory with an address bus.

11. A non-transitory computer-readable recording medium storing a binary code that when read and executed by a microprocessor, causes the microprocessor to perform a method by executing the binary code, said binary code defining a data structure comprising multiple fields able to be accessed independently of one another, including a particular field to be read using a pointer, said method comprising:

(a) writing, to a main memory, a value of the particular field, which is associated with a first field pointer identifier, said first field pointer identifier identifying the field pointer to be used to read the value of said particular field, and (b) reading the value of said particular field of the data structure from the main memory, said reading step comprising the following operations:

(b1) obtaining a data structure pointer that points to a start of the data structure, said data structure pointer containing a first range of bits containing a starting address of the data structure in an address space of the computer program, and a second, different range of bits containing a data structure pointer identifier, said data structure pointer identifier uniquely identifying said data structure pointer among a set containing multiple different data structure pointers implemented in a same execution of the binary code by said microprocessor, (b2) constructing the field pointer that points directly to the particular field of the data structure to be read, said field pointer containing a first range of bits containing a starting address of the particular field in the address space of the computer program, and a second range of bits containing a second field pointer identifier, the constructing operation (b2) comprising the following sub-operations:

(b2.1) determining the starting address of the particular field from the starting address contained in the first range of bits of the data structure pointer and a position of the particular field with respect to the start of the data structure, (b2.2) determining the second field pointer identifier from the data structure pointer identifier contained in the second range of bits of the data structure pointer obtained in operation (b1), and (b3) loading, from the main memory, the value of the particular field using the address contained in the first range of bits of the field pointer constructed in operation (b2), and (b4) checking that the second field identifier contained in the second range of bits of the field pointer constructed in operation (b2) corresponds to the first field pointer identifier associated with the particular field when said value is written to the main memory, and when the first and second field pointer identifiers do not match, triggering a signalling of an execution fault, and when the first and second field point identifiers match, suppressing the triggering of the signalling of an execution fault and processing, with the microprocessor, the loaded value of the particular field, wherein in step (a), the first field pointer identifier associated with the particular field is determined from the data structure pointer identifier and from an identifier of the particular field that differs for all fields of the data structure that are adjacent to the particular field to be read, and in operation (b2), the second field pointer identifier is additionally determined from the same identifier of the particular field in order to obtain the second field pointer identifier that systematically corresponds to the first field pointer identifier when the data structure pointer identifier is identical to one used to determine the first field pointer identifier.

12. A microprocessor configured to execute a binary code of a computer program, said binary code defining a data structure comprising multiple fields able to be accessed independently of one another, including a particular field to be read using a pointer, said microprocessor being configured to:

(a) write, to a main electronic memory, a value of the particular field, which is associated with a first field pointer identifier, said first field pointer identifier identifying a field pointer to be used to read the value of said particular field, and (b) read the value of said particular field of the data structure from the main electronic memory, said reading step comprising the following operations:

(b1) obtaining a data structure pointer that points to a start of the data structure, said data structure pointer containing a first range of bits containing a starting address of the data structure in an address space of the computer program, and a second, different range of bits containing a data structure pointer identifier, said data structure pointer identifier uniquely identifying said data structure pointer among a set containing multiple different data structure pointers implemented in a same execution of the binary code by said microprocessor, (b2) constructing the field pointer that points directly to the particular field of the data structure to be read, said field pointer containing a first range of bits containing a starting address of the particular field in the address space of the computer program, and a second range of bits containing a second field pointer identifier, said constructing operation (b2) comprising the following sub-operations:

(b2.1) determining the starting address of the particular field from the starting address contained in the first range of bits of the data structure pointer and a position of the particular field with respect to the start of the data structure, and (b2.2) determining the second field pointer identifier from the data structure pointer identifier contained in the second range of bits of the data structure pointer obtained in operation (b1), (b3) loading, from the main memory, the value of the particular field using the address contained in the first range of bits of the field pointer constructed in operation (b2), and (b4) checking that the second field identifier contained in the second range of bits of the field pointer constructed in operation (b2) corresponds to the first field pointer identifier associated with the particular field when its value is written to the main memory, and when the first and second field pointer identifiers do not match, triggering the signalling of an execution fault, and when the first and second field point identifiers match, suppressing the triggering of the signalling of an execution fault and processing, with the microprocessor, the loaded value of the particular field, wherein said microprocessor is further configured to:
in step (a), determine the first field pointer identifier associated with the particular field from the data structure pointer identifier and from an identifier of the particular field that differs for all fields of the data structure that are adjacent to the particular field to be read, and in operation (b2), additionally determine the second field pointer identifier from the same identifier of the particular field in order to obtain the second field pointer identifier that systematically corresponds to the first field pointer identifier when the data structure pointer identifier is identical to one used to determine the first field pointer identifier.

13. The microprocessor according to claim 12, wherein a set of instructions of the microprocessor contains an instruction that, when executed by an arithmetic logic unit of the microprocessor, stores, in the second range of bits of the data structure pointer, a result of an exclusive-or between the bits of said second range of bits and a pointer identifier passed as an operand of said instruction.

* * * * *